United States Patent
Chiu et al.

(10) Patent No.: US 8,034,308 B2
(45) Date of Patent: Oct. 11, 2011

(54) MULTI-STAGE MULTI-TUBE SHELL-AND-TUBE REACTOR

(75) Inventors: Yuon Chiu, Denville, NJ (US); Stephen A. Cottrell, Baton Rouge, LA (US); Richard Durick Horwath, Morristown, NJ (US); Haluk Kopkalli, Staten Island, NY (US)

(73) Assignee: Honeywell International, Inc., Morristown, NJ (US)

( * ) Notice: Subject to any disclaimer, the term of this patent is extended or adjusted under 35 U.S.C. 154(b) by 247 days.

(21) Appl. No.: 12/481,107

(22) Filed: Jun. 9, 2009

(65) Prior Publication Data

US 2010/0307726 A1 Dec. 9, 2010

(51) Int. Cl.
*B01J 8/06* (2006.01)

(52) U.S. Cl. ........ 422/652; 422/198; 422/200; 165/140; 165/164; 165/165; 165/172; 165/173; 165/177

(58) Field of Classification Search .................. 422/652, 422/198, 200; 165/140, 164, 165, 172, 173, 165/177
See application file for complete search history.

(56) References Cited

U.S. PATENT DOCUMENTS

| | | | |
|---|---|---|---|
| 2,382,255 A * | 8/1945 | Pyzel | 165/140 |
| 3,566,961 A | 3/1971 | Lorenz et al. | |
| 3,792,980 A | 2/1974 | Vollmer et al. | |
| 4,101,287 A | 7/1978 | Sweed et al. | |
| 4,312,184 A * | 1/1982 | Mangus | 60/644.1 |
| 4,768,584 A * | 9/1988 | Kehrer et al. | 165/140 |
| 4,929,798 A | 5/1990 | de Lasa | |
| 5,027,891 A | 7/1991 | Fulford et al. | |
| 5,069,169 A | 12/1991 | Maruko | |
| 5,333,682 A | 8/1994 | Liu | |
| 5,869,011 A | 2/1999 | Lee | |
| 6,180,846 B1 | 1/2001 | Dandekar et al. | |
| 6,620,386 B1 | 9/2003 | Welch | |
| 6,790,431 B2 | 9/2004 | Wang et al. | |
| 7,521,028 B2 | 4/2009 | Smith et al. | |

* cited by examiner

*Primary Examiner* — Walter Griffin
*Assistant Examiner* — Huy-Tram Nguyen
(74) *Attorney, Agent, or Firm* — Bruce O. Bradford

(57) ABSTRACT

A multi-stage, multi-tube, shell-and-tube reactor which contains reaction zones and interstage temperature control (cooling/heating) zones in series. The reactor has at least two types of zones which both contribute to removing or supplying heat to the system depending on the system's need. The reactor will have a group of reaction zones which contain tubes packed with catalyst to progress the reaction and remove or supply heat simultaneously. There are also a number of interstage temperature control (cooling/heating) zones which are designed to supply or remove heat to or from the system. The positioning, number, and design of the zones will depend on the amount of temperature control desired and exothermic or endothermic nature of the processes to be conducted in the reactor.

18 Claims, 2 Drawing Sheets

Shell-and-Tube Reactor

MULTI-STAGE MULTI-TUBE SHELL-AND-TUBE REACTOR

FIELD OF THE INVENTION

The present invention relates to shell-and-tube catalytic reactors having improved heating or cooling capabilities for use with exothermic or endothermic chemical reactions.

BACKGROUND OF THE INVENTION

Generally, a shell-and-tube catalytic reactor is a type of reactor which is used to efficiently remove reaction heat. In some uses of these reactors, a catalyst is filled in a plurality of reaction tubes; a reaction fluid (gas and/or liquid) into the reaction tubes to cause a chemical reaction for obtaining a desired product; and a heat transfer medium is circulated through the reactor shell such that the chemical reaction can occur under controlled thermal conditions. Shell and tube reactors typically include a number of reaction tubes held in place in the shell by one or more tubesheets; shell nozzles are used for introducing and withdrawing the heat transfer medium; tube nozzles are used for introduction of reactants into the reaction tubes and for withdrawing product therefrom; and appropriate dividers and/or baffles are used to separate the respective reactor parts for their specific functions. The reactor parts are typically made from materials that do not react with the materials being processed in the reactor.

In some cases, during the use of shell-and-tube catalytic reactors, hot spots can occur at a local point in one or more of the reaction tubes. These hot spots can cause problems, such as the deterioration of the catalyst, leading to a reduction in catalyst life, and/or a decrease in the production of the desired product. Thus, methods for efficiently transferring heat to or from the reaction tubes in the shell-and-tube reactor is a desirable goal.

Prior Art:

The following prior art documents are hereby incorporated herein by reference in their entirety.

U.S. Pat. No. 3,566,961 is entitled "tubular reactor for carrying out endothermic and exothermic reactions with forced circulation." As set forth in the abstract, this patent teaches a tubular reactor with forced circulation of a heat transfer medium which flushes the outside of the reaction tubes in axial direction, the heat transfer medium being supplied to, and withdrawn from, the reactor wall uniformly through circular pipelines, and particularly the constructional shape of deflecting guide plate means arranged transversely to the direction of flow and having annular openings around the reaction tubes for uniform flow towards all the tubes of the nest of tubes.

U.S. Pat. No. 3,792,980 is entitled "reactor for carrying out reactions accompanied by a change in heat." As set forth in the abstract, this patent teaches a shell and tube reactor for reactions accompanied by a change in heat. Reaction material flows through the tubes and a heat exchange medium flow through the shell to remove or supply heat of the reaction. Also a pump disposed in the reactor on the shell side circulates the heat exchange medium within the shell. The tubes are disposed in spaced sectors so that passageways are provided for the circulating heat exchange medium. Heat exchange medium is withdrawn and supplied to the shell and is itself subjected to heat exchange outside the reactor. Improved distribution of the heat exchange medium within the shell is obtained by withdrawing and supplying the heat exchange medium, respectively, from and to the aforesaid passageways.

U.S. Pat. No. 4,101,287 is entitled "combined heat exchanger reactor." As set forth in the abstract, this patent teaches a one-piece, integral, high strength, combined heat exchanger-reactor comprising a monolithic honeycomb structure wherein the channels thereof are divided into two or more groups; group one carrying one fluid and group two carrying another fluid which differs from the first in composition and/or temperature and/or pressure and/or direction of flow, the main design feature of the combined heat exchanger-reactor (CHER) being that group one channels extend outward parallel to the channel axis and perpendicular to the cross-section of the honeycomb and each channel of this group one being in thermal contact through common walls with channels of group two while each channel of group one is separated from other channels of group one by the intervening voids formed by the presence of the channels of group two. The extended ends of the channels of group one extending from one or both ends of the honeycomb are manifolded at one or both ends so as to form a separation of the entrances and/or exits of the extended group one channels from the recessed group two channels thereby permitting the entry and/or exit of fluid in group one channels while preventing entry of the same fluid into the group two channels thereby permitting the independent passage of different fluids through the different channel one and channel two systems, the common wall which exists between channels of the different groups allowing heat conduction from the fluid in one group of channels to the fluid in the other group of channels. In this manner, very precise concentration and/or temperature control may be maintained over the fluids and/or catalysts which exist in the different channel groups, enabling one to perform complex reactions, either self-induced or catalytic, in the reactor with greatly enhanced yields and/or selectively due to the refined temperature and/or concentration control which is made possible by the present invention.

U.S. Pat. No. 4,929,798 is entitled "pseudoadiabatic reactor for exothermal catalytic conversions." As set forth in the abstract, this patent teaches a multitubular catalytic reactor for exothermal catalytic reactions comprises a bundle of parallel tubes all of the same length and a catalyst within the tubes. The tube bundle has an inlet side and an outlet side. Devices are provided for introducing separately reactants to within the tubes of the reactor and coolant to the channels defined between adjacent tubes of the bundle. The coolant is introduced into the channels co-currently with the direction of flow of the reactants. The products are withdrawn from the tubes independently of the coolant. The reactor is particularly adapted to a single stage conversion of methanol into gasoline boiling point range constituents using crystalline aluminosilicate catalysts.

U.S. Pat. No. 5,027,891 is entitled "method for transferring heat between process liquor streams." As set forth in the abstract, this patent teaches a method of transferring heat between process liquor streams such as streams of caustic liquor in the Bayer process for producing alumina from bauxite, utilizing a heat pipe arrangement for heat exchange. The process streams respectively pass in contact with one surface of a first heat-exchange wall and one surface of a second heat-exchange wall while being isolated from the second surfaces of the two walls; these second walls are exposed to a closed volume (also isolated from both process streams) containing a heat transfer fluid that vaporizes below the temperature of the hotter process stream and condenses above the temperature of the cooler process stream. The heat transfer fluid vaporizes at the exposed surface of the wall contacted by the hotter stream, and condenses at the exposed surface of the wall contacted by the cooler stream, thereby transferring heat (as heat of vaporization) from the former stream to the latter.

U.S. Pat. No. 6,180,846 is entitled "process and apparatus using plate arrangement for combustive reactant heating." As set forth in the abstract, this patent teaches a process and apparatus for indirectly heating an endothermic reaction by combustion of reactants or products from the endothermic reaction using a plate heat exchange arrangement in a highly efficient manner. This invention is particularly suited for processes such as the production of styrene or synthesis gas. When producing synthesis gas, oxidizing reactants in a secondary reforming step generates heat for a primary reforming step and the process improves selectivity and yield with a highly efficient heat exchange step that uses narrow channel for indirect heat exchange. The narrow channels are preferably defined by corrugated plates. The primary reaction channels will contain a catalyst for the promotion of the primary reaction such as steam reforming or ethylbenzene dehydrogenation. The secondary heating step may be performed outside of the heat exchange channels with hot effluent gases passing through the heat exchange channels to provide heat to the primary reaction step or the secondary reaction channels may contain combustion promoting catalyst to generate the heat in-situ.

U.S. Pat. No. 6,790,431 is entitled "reactor for temperature moderation." As set forth in the abstract, this patent teaches embodiments which include methods and apparatus for arranging multiple reaction zones such that at least one hot spot in one of the reaction zones is moderated by a cooler spot in an adjacent reaction zone.

U.S. Pat. No. 7,521,028 is entitled "catalytic reactor for low-Btu fuels." As set forth in the abstract, this patent teaches an improved catalytic reactor which includes a housing having a plate positioned therein defining a first zone and a second zone, and a plurality of conduits fabricated from a heat conducting material and adapted for conducting a fluid therethrough. The conduits are positioned within the housing such that the conduit exterior surfaces and the housing interior surface within the second zone define a first flow path while the conduit interior surfaces define a second flow path through the second zone and not in fluid communication with the first flow path. The conduit exits define a second flow path exit, the conduit exits and the first flow path exit being proximately located and interspersed. The conduits define at least one expanded section that contacts adjacent conduits thereby spacing the conduits within the second zone and forming first flow path exit flow orifices having an aggregate exit area greater than a defined percent of the housing exit plane area. Lastly, at least a portion of the first flow path defines a catalytically active surface.

With the highly exothermic or endothermic nature of some chemical reactions, including the catalytic hydrogenation and dehydrohalogenation of certain fluorocarbons and fluoroolefins, there is a need to be able to remove or supply heat while a reaction progresses. Traditional shell-and-tube reactors do not have enough heat transfer capability to keep these reaction systems at optimal operating conditions. The present invention solves this problem by providing multi-stages and multi-tubes, whereby the ability to progress a reaction and also remove or supply heat efficiently is achieved—all in the same shell-and-tube reactor vessel.

SUMMARY OF THE INVENTION

The present invention is directed to a multi-stage, multi-tube, shell-and-tube reactor which contains reaction zones and interstage temperature control (cooling/heating) zones arranged in series.

Unlike a traditional shell-and-tube catalytic reactor which includes a number of reaction tubes and makes use of the shell as the heat exchange zone, the present invention provides one or more reaction zones, each zone including a number of reaction tubes containing catalyst; as well as one or more temperature control zones, each zone including a number of tubes containing no catalyst—but through which a heat exchange medium (for heating or cooling) may be passed. In preferred embodiments, reaction zones are separated from one another by one or more temperature control zones within the reactor shell.

The reactor has at least two types of zones which both contribute to removing or supplying heat to the system depending on the system's need. The reactor will have a group of reaction zones which contain tubes packed with catalyst to progress the reaction and remove or supply heat simultaneously. There are also a number of interstage temperature control (cooling/heating) zones which are designed to supply or remove heat to or from the system. The positioning, number, and design of these zones will depend on the amount of temperature control desired and exothermic or endothermic nature of the system.

The different tube types used for the reaction zones and the temperature control zones are preferably grouped together by the tubesheet in order to provide enough heat or heat removal while also providing a means for the reaction to take place under optimal conditions. A number of these groups may be used in series to achieve any desired reaction yield.

The tubes used for the reaction zone are preferably larger in diameter to provide room for catalyst packing. The interstage cooling/heating zone tubes are preferably smaller in diameter to provide the most efficient heat transfer scenario.

One embodiment of the invention is directed to a shell-and-tube reactor comprising a shell structure and a tubesheet located in the shell structure, wherein:

the tubesheet comprises one or more reaction zones and one or more temperature control zones, wherein:

each reaction zone comprises a plurality of aligned reaction tubes; and each temperature control zone comprises a plurality of aligned temperature control tubes.

Another embodiment of the invention is directed to a shell-and-tube reactor comprising a shell structure and a tubesheet located in the shell structure, wherein:

the tubesheet comprises two or more reaction zones and two or more temperature control zones, wherein:

each reaction zone is adjacent to a temperature control zone;

each reaction zone comprises a plurality of aligned reaction tubes; and each temperature control zone comprises a plurality of aligned temperature control tubes.

Another embodiment of the invention is directed to a shell-and-tube reactor comprising a shell structure and a tubesheet located in the shell structure, wherein:

the tubesheet comprises three or more reaction zones and three or more temperature control zones, wherein:

tubes in each reaction zone are larger in diameter than tubes in each temperature control zone;

each reaction zone is adjacent to a temperature control zone;

each reaction zone comprises a plurality of aligned reaction tubes; and each temperature control zone comprises a plurality of aligned temperature control tubes.

In certain embodiments, each reaction zone is adjacent to a temperature control zone.

In certain embodiments, tubes in a reaction zone are larger in diameter than tubes in a temperature control zone.

In certain embodiments, the shell-and-tube reactor further comprises at least two reaction zones. In certain embodiments, the shell-and-tube reactor further comprises at least three reaction zones. In certain embodiments, the reaction zone tubes contain a catalyst. In certain embodiments, at least 30 tubes are used in a reaction zone.

In certain embodiments, the shell-and-tube reactor further comprises at least two temperature control zones. In certain embodiments, the shell-and-tube reactor further comprises at least three temperature control zones. The temperature control zone tubes are generally free of catalyst—as no reaction is intended to occur in these tubes. In certain embodiments, at least 80 tubes are used in a temperature control zone.

DETAILED DESCRIPTION OF THE INVENTION

The present invention is a shell-and-tube reactor that has at least two different types of zones which can be used for either reacting or temperature control (heating/cooling) depending on the system's needs.

Figure 1:
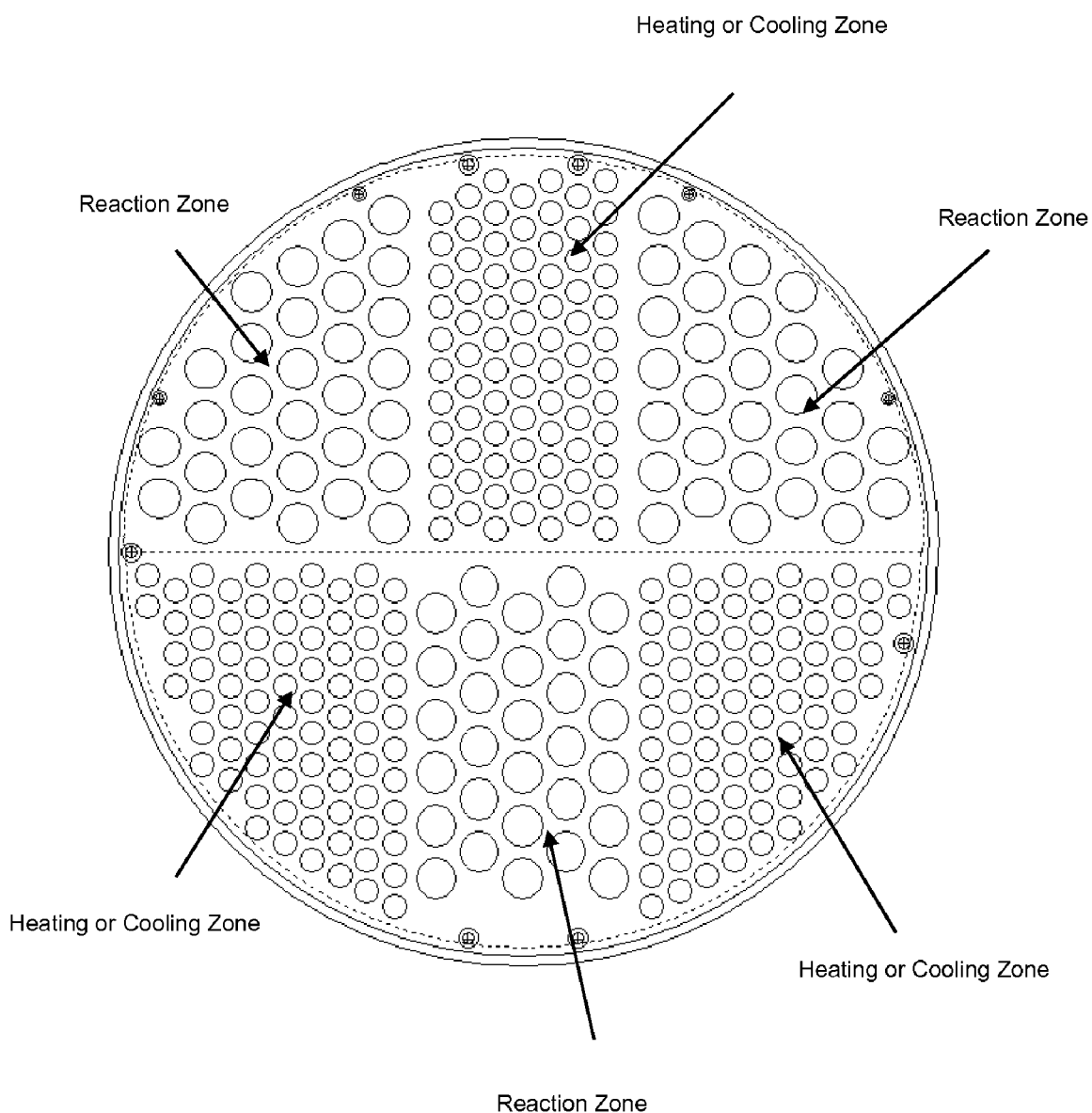
FIG. 1 shows an embodiment of one tubesheet used in the reactor of the present invention having three reaction zones separated by three temperature control (heating/cooling) zones.

Referring in detail to the drawings FIG. 1 shows an embodiment one tubesheet used in the reactor of the present invention having three reaction zones separated by three temperature control (heating/cooling) zones.

Figure 2:
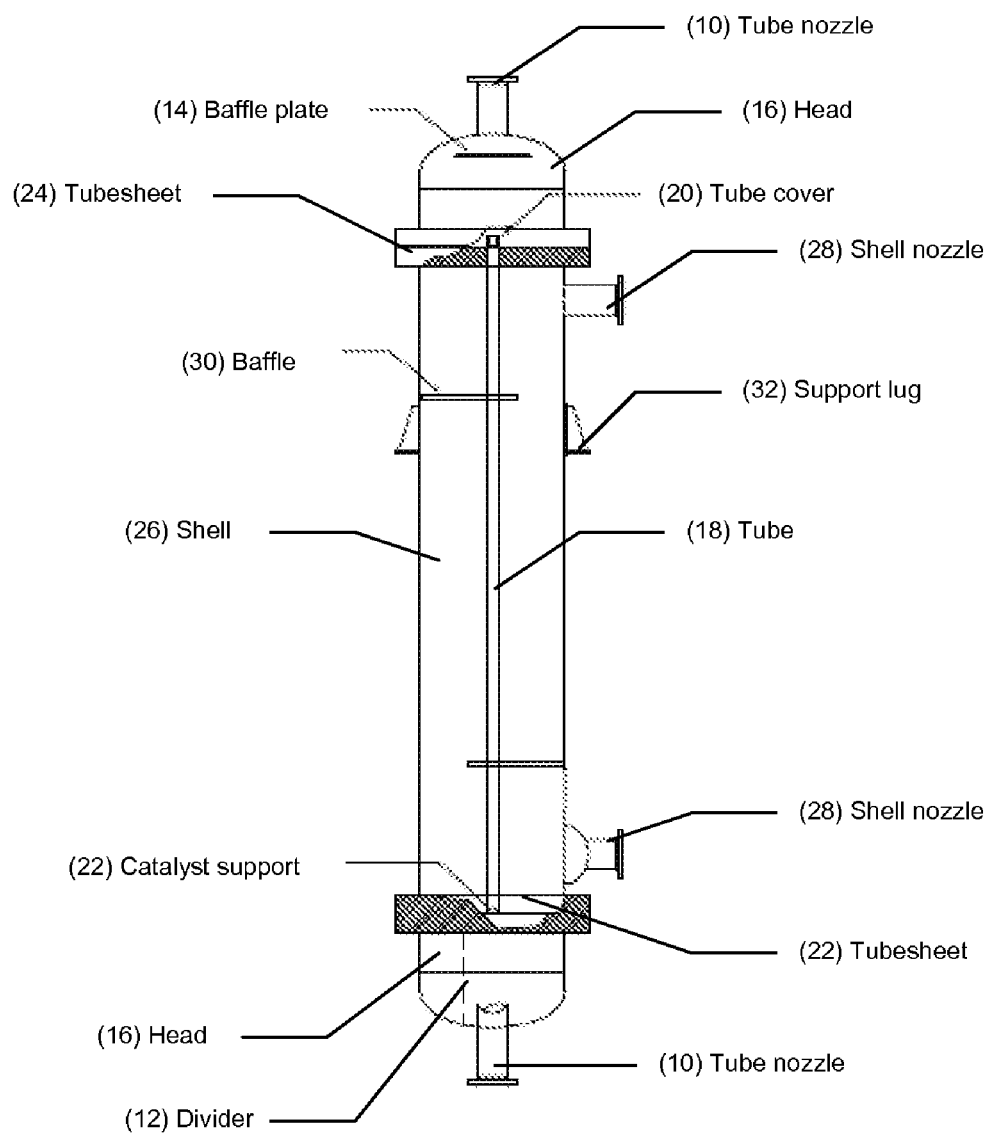
FIG. 2 shows an embodiment of the multi-stage, multi-tube, shell-and-tube reactor of the present invention.

FIG. 2 shows a vertical shell-and-tube reactor with parts normally associated with such equipment. The process fluids will enter the reactor through a tube nozzle (10) shown at the top of the figure. The dividers (12) inside the head distribute the fluid to the correct heating/cooling or reaction zone depending on the system's needs. A baffle plate (14) will slow and distribute the process fluids as they pass through a head (16) and enter the tubes (18). Tube covers (20) and catalyst supports (22) will keep the catalyst confined to the tube. Typically, a shell-and-tube reactor will have a number of tubes held in place by two or more tube sheets (24). After passing through the tubes for as many tube passes as required for the system, the process fluids will exit the reactor by flowing through the head and then through a tube nozzle shown at the bottom of the figure. The heating/cooling medium will enter the shell (26) through one of the shell nozzles (28) and exit through the other shell nozzle. The flow of the heating/cooling medium will be disrupted for better heat exchange by baffles (30) in the shell. Shell-and-tube reactors are normally held in place my support lugs (32) which connect the equipment to a support structure.

10—Tube nozzle
12—Divider
14—Baffle Plate
16—Head
18—Tube
20—Tube cover
22—Catalyst support
24—Tubesheet
26—Shell
28—Shell nozzle
30—Baffle
32—Support lug Construction of the multistage, multi-tube, shell-and-tube reactor can be done by traditional shell-and-tube manufacturing means along with some or all of the following adjustments:

1) The shell-and-tube heads are designed and fabricated in order to provide the correct multi-pass flow depending on the system's needs.
2) Reactor tubesheets are designed and fabricated in order to account for the different zones and different tube diameters depending on the system's needs.
3) While charging the reactor with catalyst, the zones that do not require catalyst are avoided either with screen screw inserts or other traditional means depending on the system's needs. This can be achieved with a catalyst charging device which is a tool that can direct catalyst into the correct tubes and has a configuration that blocks off or blinds the tubes that do not require catalyst.
4) In order to promote better heat transfer, the heating/cooling tubes can be filled with heat transfer enhancers which provide extended surface area, such as metal packing commonly used in chemical processing. Additionally, the reaction zone and/or the heating/cooling zone tubes can be fabricated to promote better heat transfer by extending the tube surface area or aiding turbulation of the tube-side fluid, which are commonly done with external fins or internal rifling, respectively.

Reaction Example

Dehydrofluorination reactions are known in the art. See for example, U.S. Patent Publication No. 20080051610 A1, the disclosure of which is hereby incorporated herein by reference. As taught therein, dehydrofluorination of HFC-245fa is done in a vapor phase, and more preferably in a catalytic reactor in the vapor phase.

Dehydrofluorination of HFC-245fa is one type of reaction that may be conducted in the multi-stage, multi-tube, shell-and-tube reactor of the present invention. In such a case the reactor should be constructed from materials which are resistant to the corrosive effects of hydrogen fluoride such as nickel and its alloys, including Hastelloy, Inconel, Incoloy, and Monel or vessels lined with fluoropolymers. Other suitable materials used under suitable conditions could be steel or stainless steel.

A dehydrofluorinating catalyst is employed in the reaction zone tubes. This catalyst may be one or more of fluorinated metal oxides in bulk form or supported, metal halides in bulk form or supported, and carbon supported transition metals, metal oxides and halides. Suitable catalysts non-exclusively include fluorinated chromia (fluorinated $Cr_2O_3$), fluorinated alumina (fluorinated $Al_2O_3$), metal fluorides (e.g., $CrF_3$, $AlF_3$) and carbon supported transition metals (zero oxidation state) such as Fe/C, Co/C, Ni/C, Pd/C.

The HFC-245fa is introduced into the reactor either in pure form, impure form, or together with an optional inert gas diluent such as nitrogen, argon, or the like. In some cases HFC-245fa is pre-vaporized or preheated prior to entering the reactor. Alternatively, the HFC-245fa is vaporized inside the reactor.

The reactor components must be suitable for performing the desired process. For example, in the dehydrofluorination of HFC-245fa, the useful reaction temperatures may range from about 100° C. to about 600° C. Preferred temperatures may range from about 150° C. to about 450° C., and more preferred temperatures may range from about 200° C. to about 350° C. The reaction may be conducted at atmospheric pressure, super-atmospheric pressure or under vacuum. The vacuum pressure can be from about 5 torr to about 760 torr. Contact time of the HFC-245fa with the catalyst may range from about 0.5 seconds to about 120 seconds, however, longer or shorter times can be used.

The process flow may either be in the down or up direction through a bed of the catalyst in the reaction zones. If the reaction zones require heating for optimal reaction, one or more of the temperature control zones is charged with a heating medium that provides sufficient heat to the reaction zones to provide the desired reaction temperature. Materials suitable for use as a heating medium are well known to persons having ordinary skill in this art, and include for example, hot tempered water, hot oil, and condensing steam. Similarly, if the reaction zones require cooling to maintain optimal reaction conditions, one or more of the temperature control zones is charged with a suitable cooling medium that removes heat and achieves or maintains the desired temperature in the reaction zones. Materials suitable for use as a cooling medium are well known to persons having ordinary skill in this art, and include for example, cooling water and boiling water.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A shell-and-tube reactor comprising a shell structure and a tubesheet located in the shell structure, wherein:
    the tubesheet comprises one or more reaction zones and one or more temperature control zones, wherein:
    each reaction zone comprises a plurality of aligned reaction tubes; and
    each temperature control zone comprises a plurality of aligned temperature control tubes; and
    wherein tubes in a reaction zone are larger in diameter than tubes in a temperature control zone.

2. The shell-and-tube reactor of claim 1, wherein each reaction zone is adjacent to a temperature control zone.

3. The shell-and-tube reactor of claim 1 further comprising at least two reaction zones.

4. The shell-and-tube reactor of claim 1 further comprising at least two temperature control zones.

5. The shell-and-tube reactor of claim 1 further comprising at least three reaction zones.

6. The shell-and-tube reactor of claim 5, wherein each reaction zone comprises a plurality of tubes containing a catalyst.

7. The shell-and-tube reactor of claim 6, wherein each reaction zone includes at least 30 tubes.

8. The shell-and-tube reactor of claim 1 further comprising at least three temperature control zones.

9. The shell-and-tube reactor of claim 8, wherein each temperature control zone comprises a plurality of tubes free of catalyst.

10. The shell-and-tube reactor of claim 9, wherein each temperature control zone includes at least 80 tubes.

11. A shell-and-tube reactor comprising a shell structure and a tubesheet located in the shell structure, wherein:
    the tubesheet comprises two or more reaction zones and two or more temperature control zones, wherein:
    each reaction zone is adjacent to a temperature control zone;
    each reaction zone comprises a plurality of aligned reaction tubes; and
    each temperature control zone comprises a plurality of aligned temperature control tubes; and
    wherein tubes in a reaction zone are larger in diameter than tubes in a temperature control zone.

12. The shell and tube reactor of claim 11 further comprising at least three reaction zones.

13. The shell-and-tube reactor of claim 12, wherein each reaction zone comprises a plurality of tubes containing a catalyst.

14. The shell-and-tube reactor of claim 13, wherein each reaction zone includes at least 30 tubes.

15. The shell and tube reactor of claim 14 further comprising at least three temperature control zones.

16. The shell-and-tube reactor of claim 15, wherein each temperature control zone comprises a plurality of tubes free of catalyst.

17. The shell-and-tube reactor of claim 16, wherein each temperature control zone includes at least 80 tubes.

18. A shell-and-tube reactor comprising a shell structure and a tubesheet located in the shell structure, wherein:
    the tubesheet comprises three or more reaction zones and three or more temperature control zones, wherein:
    tubes in each reaction zone are larger in diameter than tubes in each temperature control zone;
    each reaction zone is adjacent to a temperature control zone;
    each reaction zone comprises a plurality of aligned reaction tubes; and
    each temperature control zone comprises a plurality of aligned temperature control tubes.

* * * * *